No. 627,450. Patented June 20, 1899.
G. S. WALKER.
COMB CUTTING MACHINE.
(Application filed Oct. 7, 1898.)
(No Model.) 6 Sheets—Sheet 1.
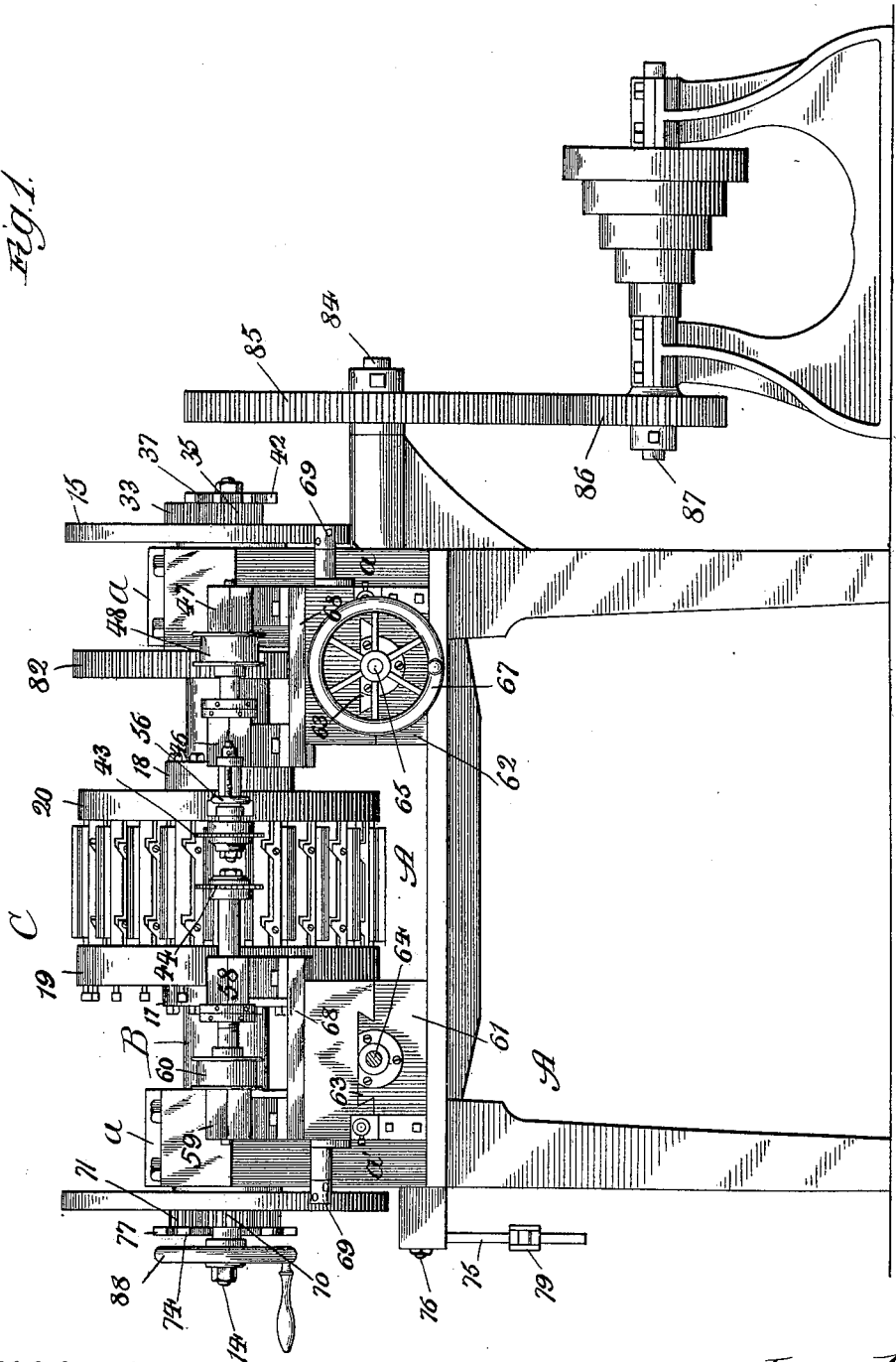
Witnesses
Inventor:
George S. Walker,
By L. B. Coupland & Co
Att'ys

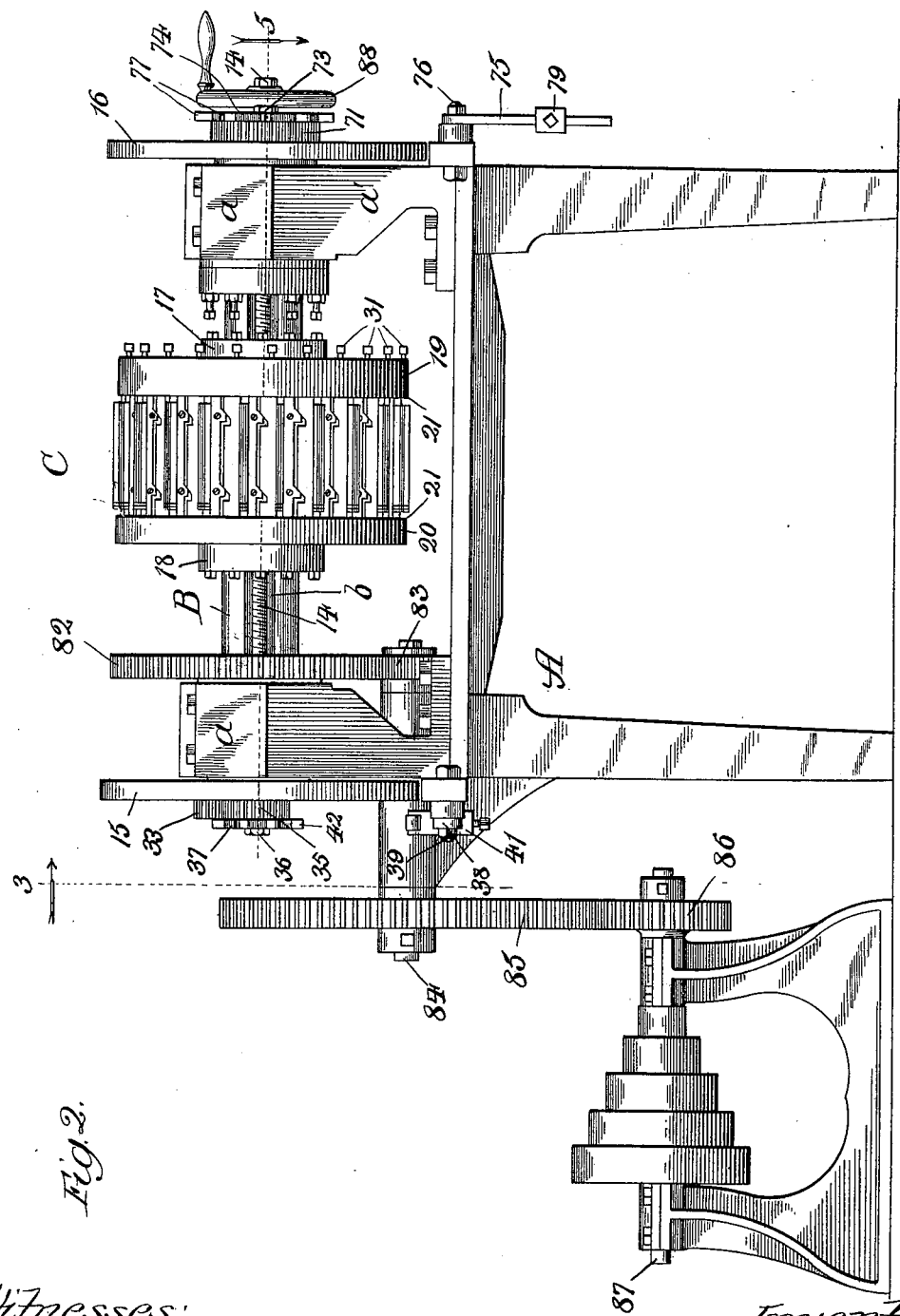

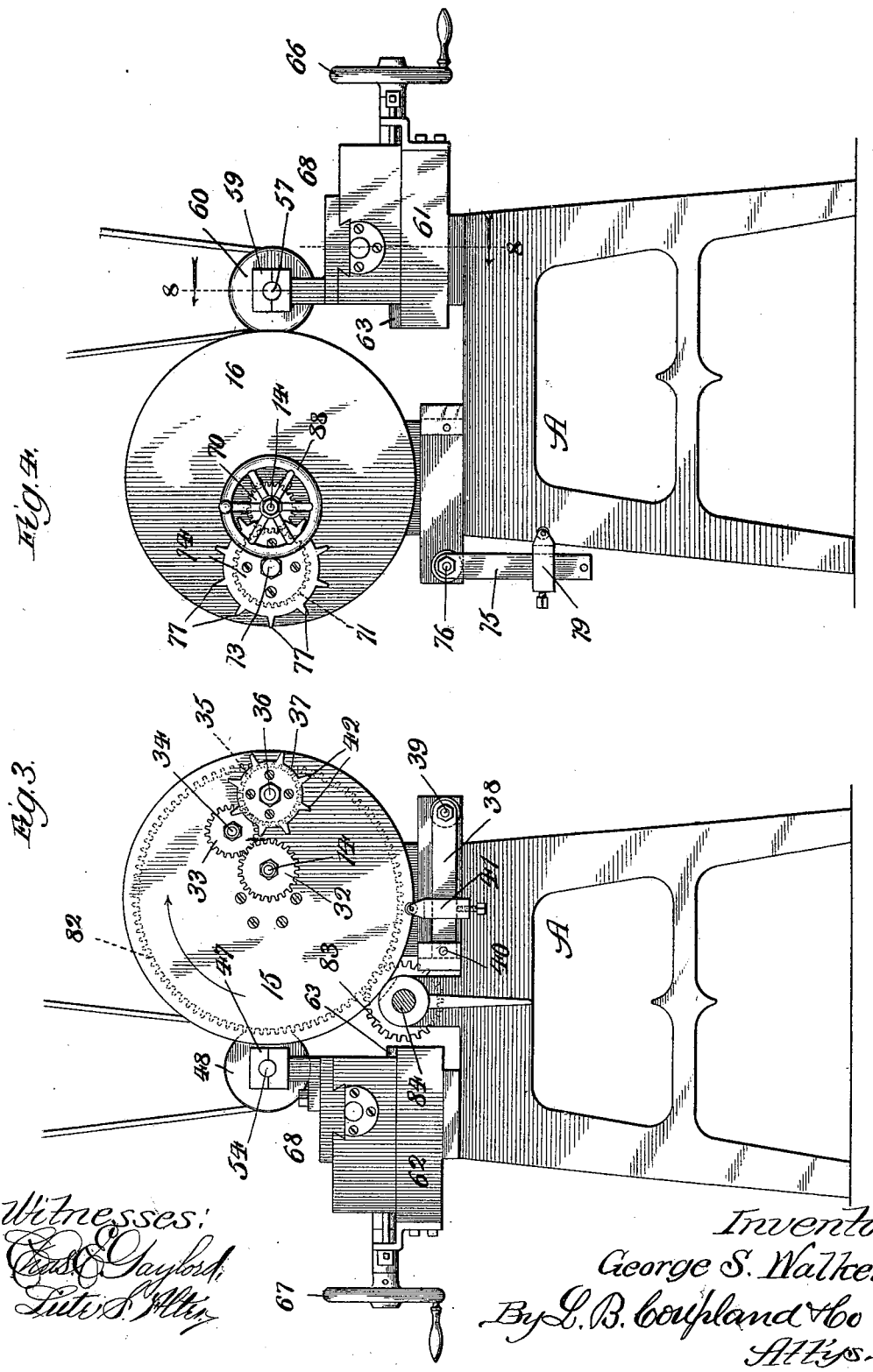

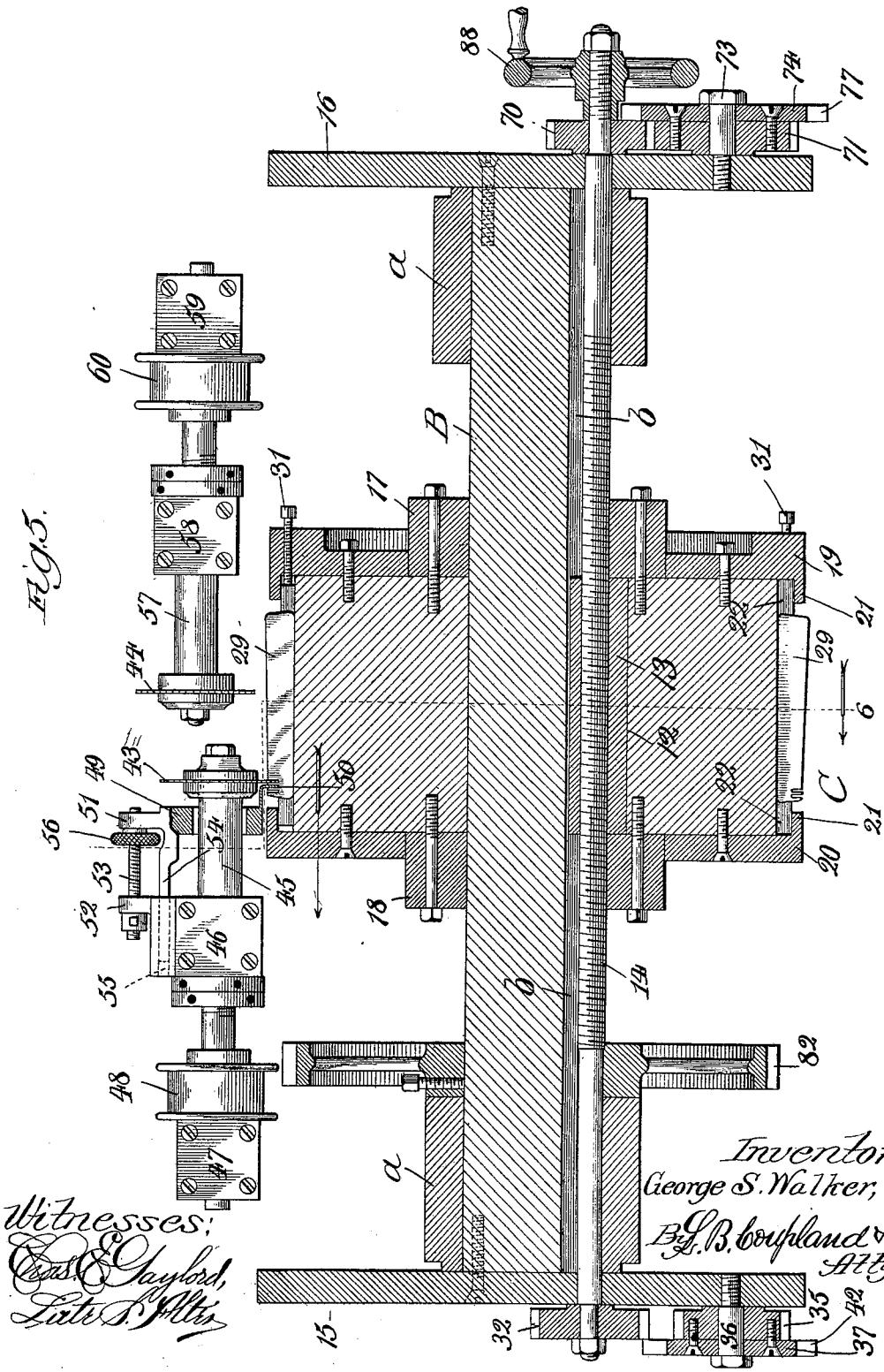

No. 627,450. Patented June 20, 1899.
G. S. WALKER.
COMB CUTTING MACHINE.
(Application filed Oct. 7, 1898.)
(No Model.) 6 Sheets—Sheet 5.

Witnesses:

Inventor,
George S. Walker,
By L. B. Coupland & Co.
Attys

No. 627,450. Patented June 20, 1899.
G. S. WALKER.
COMB CUTTING MACHINE.
(Application filed Oct. 7, 1898.)
(No Model.) 6 Sheets—Sheet 6.
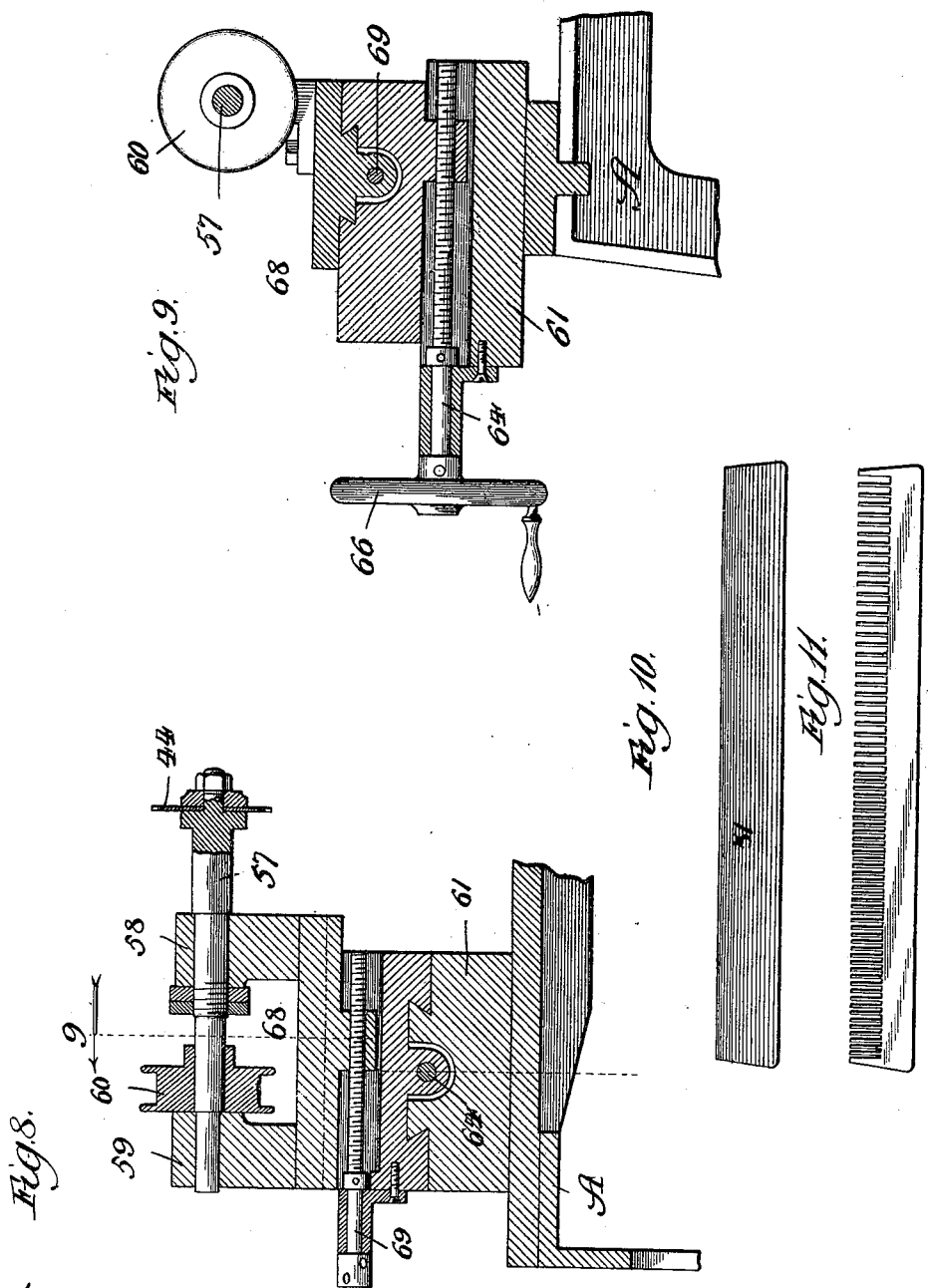
Witnesses:
Inventor:
George S. Walker,
By L. B. Coupland & Co.
Att'ys

UNITED STATES PATENT OFFICE.

GEORGE S. WALKER, OF LEMONT, ILLINOIS, ASSIGNOR TO THE ILLINOIS PURE ALUMINUM COMPANY, OF SAME PLACE.

COMB-CUTTING MACHINE.

SPECIFICATION forming part of Letters Patent No. 627,450, dated June 20, 1899.

Application filed October 7, 1898. Serial No. 692,898. (No model.)

*To all whom it may concern:*

Be it known that I, GEORGE S. WALKER, a citizen of the United States, residing at Lemont, in the county of Cook and State of Illinois, have invented certain new and useful Improvements in Comb-Cutting Machines; and I do hereby declare the following to be a full, clear, and exact description of the invention, such as will enable others skilled in the art to which it appertains to make and use the same.

This invention relates to improvements in machines for cutting combs, and has for its object to provide an automatic device of this character that will greatly simplify and facilitate the operation, the same consisting of certain novel features in the construction, arrangement, and combination of the different parts, as will be hereinafter set forth in detail.

Figure 6:
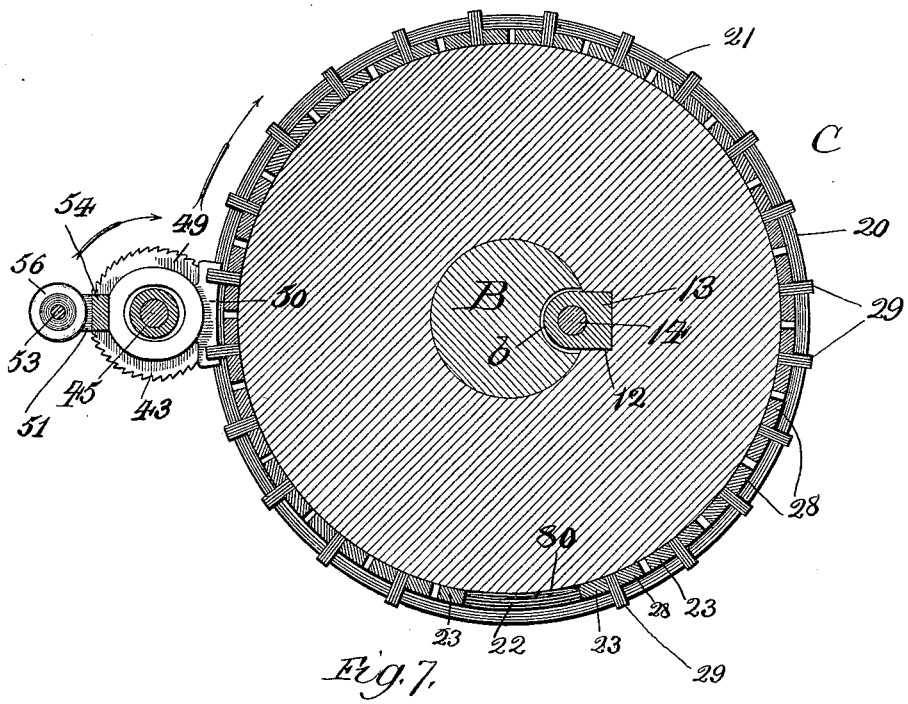
Figure 7:
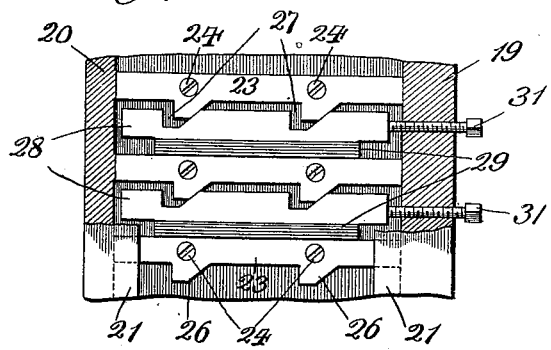

In the drawings, Figure 1 is a front side elevation of a machine embodying the improved features. Fig. 2 is a rear side elevation. Fig. 3 is an end elevation and part section on line 3, Fig. 2, looking in the direction indicated by the arrow. Fig. 4 is an elevation of the opposite end. Fig. 5 is a horizontal section on line 5, Fig. 2. Fig. 6 is a vertical transverse section on angle-line 6, Fig. 5; Fig. 7, a broken-away sectional detail of the work-holding drum; Fig. 8, a broken-away vertical section on line 8, Fig. 4; Fig. 9, a broken-away vertical section on line 9, Fig. 8. Fig. 10 is an elevation of one of the comb-blanks, and Fig. 11 shows a finished comb.

A represents the different parts of the main frame, which may be of any desired form best adapted to support the working mechanism.

B is a rotatable drum-shaft, provided at each end with journal-bearings $a\, a$, supported on companion standards $a'\, a'$, bolted to the top of the main frame. A work-holding drum C is mounted on said shaft and is adapted to have a rotary motion therewith and a simultaneous intermittent endwise movement thereon in bringing the work into position to be engaged by the cutting mechanism. The shaft B is provided with a recess or key-groove $b$ and the drum with a corresponding recess 12, in which is loosely seated a key-nut 13, Figs. 5 and 6, and joins the shaft and drum together and provides for a continuous rotary movement. This key-nut is mounted on an endless screw-shaft and has a threaded engagement therewith and provides for an endwise or longitudinal movement of the drum on its rotating shaft. The respective ends of this screw-shaft extend through the companion disk-wheels 15 and 16, which provide suitable bearings therefor. The disk-wheels are rigidly secured to the rotatable drum-shaft B.

The companion collars 17 and 18 are loosely mounted on the drum-shaft and are bolted to the respective ends of the drum C. The companion rings 19 and 20 are in turn mounted on the collars and are also bolted to the ends of the drum, as shown in Fig. 5. The peripheries of the rings 19 and 20 extend a little beyond the periphery of the drum and are provided on their inner edges with an overhanging flange or rim 21, which provides an annular recess 22 between the overhanging flanges and that portion of the periphery of the drum covered thereby, as shown in Figs. 5 and 7.

On the periphery of the drum C is mounted and disposed at intervals a series clamping or cam bars, by means of which the work is locked and held in place during the operation of cutting the teeth. These clamping-bars are arranged alternately with reference to each other. The stationary bars 23, Fig. 7, are rigidly secured to the drum by the screws 24, the ends of these bars extending into the annular recess 22 and abutting against the overlapping surface of the clamping-rings 19 and 20. These stationary bars are provided on one edge with cam-lugs 26, which are adapted to loosely engage with the correspondingly-shaped notches 27, formed in the adjacent edges of the movable bars 28, and have a wedging action in clamping the work or series of comb-blanks 29 in proper position on the drum for contact with the cutting mechanism. The movable clamping-bars 28 are thrown into a locking position by means of a series of set-screws 31, which are inserted through the ring 19 and engage with the ends of the movable bars, as shown in Fig. 7. By slacking back on these screws the clamping action is relaxed and the work may be taken out or inserted. By tightening up on the same the work is locked in place.

On that end of the screw-shaft 14 extending through the disk-wheel 15 is mounted a pinion 32, Figs. 1, 2, 3, and 5, engaging with a pinion 33, mounted on a stub-shaft 34, fixed in the disk-wheel. The pinion 33 in turn engages with a pinion 35, mounted on a stub-shaft 36, also fixed in the disk-wheel 15. A toothed movement feed-wheel 37 is rigidly secured to the pinion 35, as shown in Fig. 5. The relative position of this pinion is also indicated by dotted lines behind the movement-wheel in Fig. 3. One end of a bar 38 is secured to a part of the frame by a pivot-bolt 39, Fig. 3, the opposite end being detachably secured by a pin 40. A tripping-slide 41 is adjustably mounted on the bar 38. The upper end of this tripping-slide is set in the path of the toothed movement-wheel 37, one of the teeth 42 having contact in each revolution of the work-holding drum, which movement is in turn transmitted to the screw-shaft 14 through the train of pinions just described. This movement imparts a single impulse to the screw-shaft and causes it to rotate just far enough to move the work-carrying drum endwise the distance of one tooth-space in the comb-blanks through the medium of the key-nut engaging the screw-shaft and drum, the finer teeth of the comb being cut from this end of the machine.

The cutting mechanism consists of a saw 43 and a saw 44. The thinner saw 43 is mounted on an arbor 45, provided with suitable bearings in the journal-boxes 46 and 47. A driving-pulley 48 is also mounted on this arbor. A collar 49 loosely encircles the arbor at a point back of the saw 43, Figs. 5 and 6, and has an angle backing-plate 50 formed thereon, which is adapted to engage with and bear against the back of the tooth being cut, so as to prevent the same from being broken or bent out of shape during the operation. A lug 51 is formed on the opposite side of the collar 49 and a companion lug 52 on the arbor-bearing 46. A screw 53 has one end fixed in the lug 51, the opposite end having a threaded engagement with the lug 52, so that by rotating the screw the angle-plate 50 may be adjusted and set nearer to or farther away from the cutting-saw in accordance with the space between the teeth. A guide-bar 54 forms an integral part of the collar 49 and assists in supporting the same in its proper position. The outer or detached end of this bar slides in an opening 55 in one of the arbor-bearings, as indicated in Fig. 5. The screw 53 is rotated by means of a hand-wheel 56.

The saw 44 is mounted on the arbor 57 and is of a thicker gage than that of the saw 43. The saw 44 is for cutting the coarser teeth. This saw-arbor is supported in the journal-bearings 58 and 59 and has the driving-pulley 60 mounted thereon. A backing-plate is not provided for in connection with the saw 44, as it can usually be dispensed with in cutting the coarser teeth, which ordinarily are stiff enough to retain their proper shape in the operation of cutting. In this machine but one end of a comb is cut at a time, the journal-blocks 61 and 62, supporting the saw-arbor bearings, being provided with a dovetailed sliding bearing 63, operated by screw-rods 64 and 65, having hand-wheels 66 and 67 mounted thereon, as shown in Figs. 1, 3, 4, and 9. By this means the particular saw not in use may be backed away from or moved up to the work.

As illustrated in Fig. 5, the operation of cutting the finer teeth is in progress, the mechanism for cutting the coarse end of the combs being at rest.

The two-part bearing-blocks supporting the saw-arbors have an adjustment at right angles. The upper parts 66 and 67, Figs. 8 and 9, have a dovetailed sliding bearing 68 on top of the blocks 61 and 62, so that the saw-arbors have a longitudinal adjustment as well as the lateral movement away from and toward the work-holding drum. This movement is effected by means of a screw-rod 69 and is for the purpose of adjusting the cutting mechanism with reference to the length of the comb-blanks shorter or longer than those shown in position on the drum in producing combs of different lengths.

On that end of the screw-shaft 14 extending through the disk-wheel 16 is mounted a pinion 70, Figs. 1, 2, 4, and 5, which engages with a pinion 71, mounted on a stub-shaft 73, fixed in its disk-wheel. A toothed movement feed-wheel 74 is also mounted on this stub-shaft and is rigidly secured to the pinion 71. One end of a bar 75 is secured to the frame by a pivot-bolt 76. This bar is disengaged from its working position, Fig. 4, so that the teeth 77 of the movement feed-wheel 78 do not have contact with the tripping-slide 79 as the carrying disk wheel rotates, the cutting mechanism from this end of the machine not being in operation.

The bar 75 and its parts are duplicates of the bar 38 and its parts. (Shown in a working position in Fig. 3.) When one half of a comb has been cut, the bar 38 is dropped down to the position of the companion bar 75, which is then in its turn raised up to its working position and the other end of the comb cut, the operation of moving the work-carrying drum in the opposite direction being the same as that described for the other end of the machine in the process of cutting the fine teeth.

A vacant space or break is provided for on the surface of the work-carrying drum, as at 80, Fig. 6, which extends from end to end. The different parts of the mechanism for imparting the required endwise movement to the drum are so set and timed that the movement tooth by tooth takes place when this clear space or break is just in line with the saw and moves the work up for a new cut or tooth once in each revolution of the drum.

The series of comb-blank sections 29 are each made up of a number of blanks 81 placed side by side, so that a number of teeth are cut in each revolution.

A gear-wheel 82 is mounted on the drum-shaft B and engages with a pinion 83, mounted on the inner end of a counter-shaft 84. A gear-wheel 85 is mounted on the outer end of the counter-shaft and engages with a pinion 86, mounted on the cone-shaft 87, by which means the required motion is transmitted to the drum-shaft.

A hand-wheel 88 is mounted on one end of the screw-shaft and provides means for the shifting of the work-holding drum by hand as may be required.

The combs will ordinarily be made from metal; but any other material suitable for the purpose may be used.

Having thus described my invention, what I claim as new, and desire to secure by Letters Patent, is—

1. In a comb-cutting machine, the combination with the supporting-frame, of a rotatable shaft, provided with a recess or groove, of a work-holding drum, loosely mounted on said shaft and provided with a corresponding recess, an endless screw-shaft inserted in said recesses and means for operatively connecting the rotatable shaft, the drum and the screw-shaft, whereby an intermittent endwise movement is imparted to said drum simultaneously with the rotary movement thereof.

2. In a comb-cutting machine, a supporting-frame, a rotatable shaft journaled thereon and provided longitudinally with a recess or groove, a work-holding drum, mounted on said shaft and having a corresponding recess, a key-nut, loosely seated in said recess and joining the drum and its shaft for a continuous rotary movement, a screw-shaft, on which said key-nut has a threaded engagement, and means for transmitting an intermittent rotary action to said screw-shaft, whereby a corresponding endwise movement is imparted to the drum and key-nut at predetermined intervals.

3. In a comb-cutting machine, the combination with a work-holding drum and its rotating shaft, of an endless screw-shaft, a key-nut, mounted on said screw-shaft and joining the drum and its rotating shaft, the disk-wheels, rigidly secured to the respective ends of the drum-shaft, and means for imparting an intermittent rotary movement to said screw-shaft once in each revolution of said drum from either end of the machine.

4. In a comb-cutting machine, the combination with a rotatable shaft of the work-holding drum, loosely mounted thereon but rotating therewith, of a screw-shaft, a key-nut, joining said rotatable shaft and drum and threaded on said screw-shaft, the disk-wheels, secured to the respective ends of the drum-shaft, and through which the ends of said screw-shaft extend, the pinions mounted on the respective ends of the screw-shaft, the movement toothed feed-wheels, the means for transmitting motion from said pinions to the feed-wheels, and the tripping-slide, set in the path of the feed-wheels, whereby the machine may be operated from either end.

5. In a comb-cutting machine, the combination with a work-holding drum, of a series of stationary clamping-bars, rigidly secured to the periphery of the drum and disposed at intervals and provided with cam-lugs, a series of movable clamping-bars, provided with recesses for the engagement of said cam-lugs, whereby the work is locked in place on said drum.

6. In a comb-cutting machine, the combination with the cutting mechanism comprising a saw and its arbor, of a collar, loosely encircling said arbor and provided with an angle-plate, a lug and a guide-bar formed integral therewith, and a screw, adapted to adjust said angle-plate to its required position.

In testimony whereof I affix my signature in presence of two witnesses.

GEORGE S. WALKER.

Witnesses:
L. M. FREEMAN,
L. B. COUPLAND.